Dec. 30, 1969     FRANK O'DONNELL     3,486,945
ALSO KNOW AS FRANCIS O'DONNELL ET AL
BATTERY SET AND CAMERA COMBINATION
Filed Dec. 7, 1967
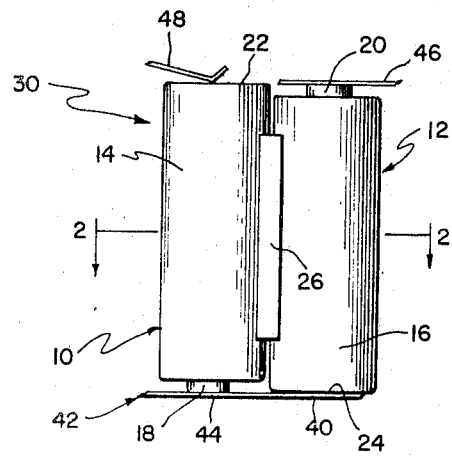
FIG. 1
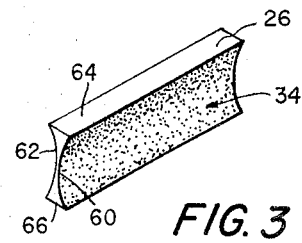
FIG. 3
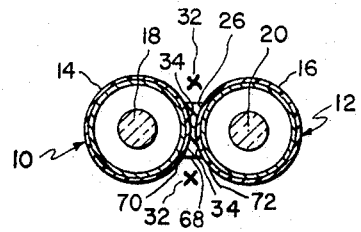
FIG. 2
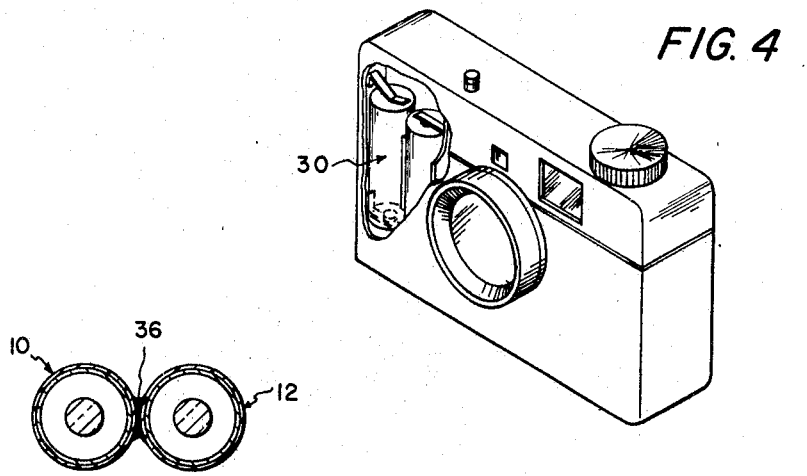
FIG. 4
FIG. 5
INVENTOR.
FRANK O'DONNELL
GEORGE SCOCCA JR
BY
Edward Halle
ATTORNEY.

United States Patent Office 3,486,945
Patented Dec. 30, 1969

3,486,945
BATTERY SET AND CAMERA COMBINATION
Frank O'Donnell (also known as Francis O'Donnell), 56 Glen Cove Road, Glen Head, N.Y. 11545, and George Scocca, Jr., 7 Chassyl Road, Commack, N.Y., 11725
Filed Dec. 7, 1967, Ser. No. 688,746
Int. Cl. H01m 1/04, 21/00
U.S. Cl. 136—173                                  7 Claims

ABSTRACT OF THE DISCLOSURE

This invention relates to a battery set in which the batteries are held in inverted relationship so that a positive and a negative terminal of each battery will be presented to external contacts in a device such as a camera or flashlight no matter which way the battery set is inserted.

---

This invention relates to a novel type of battery especially adapted for use in flashlight cameras, flashlights and other types of battery installations where it is necescary to have a battery comprising two cells in side by side relationship with the positive poles in inverted position so that when the batteries are installed, they can be electrically connected at one end by a conductor strip in the device in which they are installed running from the positive terminal of one battery to the negative terminal of the other, and also be electrically connected to a circuit in the device by means of a conductor strip from the device to the other positive terminal of one battery and the negative terminal of another battery, thus creating an electrical circuit within the device. For example, there are cameras in which flash bulbs are ignited by electricity. These cameras provide for a pair of batteries to be inserted in inverted relationship. A disadvantage is that a person who inserts the batteries in a non-inverted relationship will make an exposure with the camera but the flash will not work because the electrical circuit will not operate properly.

By providing a battery set in which the batteries are held in proper inverted position, they must necessarily be inserted properly irrespective of which end of the battery set is inserted into the camera. This will also hold true for any device in which battery cells are held laterally in inverted position.

We illustrate the invention in the accompanying drawings in which:

FIG. 1 is an elevational view of a battery set made in accordance with the invention with parts of a device in which it is installed shown;

FIG. 2 is a sectional view along the lines 2—2 of FIG. 1;

FIG. 3 is a perspective view of the connector means;

FIG. 4 is a perspective view of a flash camera with parts cut away to show the manner of installation of the invention; and FIG. 5 is a sectional view similar to FIG. 2 showing an alternate form of the invention.

Similar numerals refer to similar parts throughout the several views.

The invention comprises a set of battery cells 10 and 12 each having the usual insulated coating of paper or other material 14 and 16 around the side wall of the cell. Each cell has a positive terminal means such as at reference numerals 18 and 20 at one end, and negative terminal means such as at reference numerals 22 and 24 at the end opposite the positive terminal means. In the usual case, the negative terminal means is the bottom of the zinc, or other casing of the cell.

The use of the term "bottom" is a relative one since it will appear in FIG. 1 of the drawings that when cell 10 is in its inverted position, the bottom terminal 22 will, of course, be at the top of the completed set in lateral substantially parallel relationship to the top of positive terminal means 20 of cell 12. The cells 10 and 12 are of a suitable size for the installation, it being understood that flashlight cameras and other devices are adapted for use with standard sized cells.

There is a connector means 26 which is adapted to hold these cells in the relationship shown in FIG. 1 of the drawings in very close relationship and in inverted relationship. The connector means 26 comprises a pair of opposed concave surfaces 60 and 62 and a second pair of opposed surfaces 64 and 66. The surfaces 60 and 62 are adapted to fit the curvature of the cell walls of the batteries. We prefer to make our connector means somewhat narrower than the complete diameter of a battery cell to provide guide means so that the battery set 30 shown completely in FIG. 1 of the drawings will fit into a battery compartment which may or may not have guides or ridges positioned between the cells. The positioning of such guides or ridges in a battery compartment is indicated by the X marks in the spaces between the batteries at reference numeral 32 in FIG. 2 of the drawings. The battery set guide means comprise surface 68 and portions of the battery cell walls such as 70 and 72 as shown in FIG. 2 of the drawings. It is preferable that the batteries be held as close together as possible and firmly in the position shown in the drawings.

The connector means 26 may be made of plastic or other material having the properties of a good insulator for electricity so that there may be insulation between the cells if not provided for as a part of the cells themselves. In the ordinary case where the cells are provided with insulation such as that shown at reference numerals 14 and 16, the conector means 26 may be of a non-insulating material such as metal unless, of course, this would interfere with the internal operation of the device in which the battery set 30 is installed, in which case the connector means 26 should be of an insulating material suct as porcelain, plastic or heavy cardboard or any other such similar material.

Where the batteries have a good insulating sheath at reference numerals 14 and 16, and connecting means may be in the form of a good adhesive. Where a separate connector material piece such as that illustrated in FIG. 3 is used, we would also provide adhesive material 34 on those parts of the connector strip 26 facing the batteries 10 and 12. The adhesive could be applied to the connector strip and the batteries held together against the connector strip in a jig or other device until the adhesive sets, completing the battery set. Where an adhesive is used alone, the batteries may be placed in proper position in a jig or other device with the adhesive between them until the adhesive sets to provide the connector means for the battery. The use of an adhesive alone is shown in the form of invention shown in FIG. 5 of the drawings where the set adhesive 36 between batteries 10 and 12 holds them together.

When the battery set is completed, the positive terminal means 20 of battery 12 will be in lateral substantially parallel relationship to the negative terminal means 22 of battery 14, and the negative terminal means 24 of battery 12 will be in lateral substantially parallel relationship to the positive terminal means 18 of battery 10 as shown in FIG. 1 of the drawings. Thus, when such a battery set is inserted into a camera as shown in FIG. 4, the negative terminal 24 will automatically rest on and contact portion 40 of connector strip 42 (as shown in FIG. 1), and the positive terminal 18 will automatically rest on and contact portion 44 of connector strip 42, thus creating an electrical conductor connection between the negative and positive terminals of cells 12 and 10 respectively. This relationship can be seen in the parts shown in detail in FIG. 1 of the drawings. Further inspection of FIG. 1 will show a connecting element 46 from the camera or other device contacting positive terminal 20 of battery 12 and connecting element 48 contacting negative terminal 22 of battery cell 14. This will occur when the cover or other closure means of the camera or other device is in place. Thus, it can be seen that no matter which way the battery is inserted, the cells wil always be in inverted relationship to permit a series circuit portion running between elements 46 and 48.

The term "cell" as used herein and in the claims hereinbelow is meant to cover any battery cell, whether a true dry cell or not, which may be used in flashlights, radios, cameras and other types of electrical devices including all cordless types of electrical devices. This is meant to include the usual dry cell, mercury cell, or any other type of cell which may be placed in a battery set in accordance with the invention, and also covers various sizes and shapes of such cells even though not specifically mentioned herein.

Wherefore we claim:

1. An electric battery comprising a set of non-electrically connected laterally adjacent cells comprising cell walls, each cell being of a type having positive terminal means at one end and negative terminal means at an opposite end, said set of cells being held together by connector means in said lateral relationship with the positive terminals of each cell being in lateral substantially parallel relationship with the negative terminal means of the cell adjacent thereto, in which the connector means is at least one relatively thin piece of material positioned between said cells, said relatively thin piece of material having a pair of opposed concave surfaces adapted to fit the configuration of the said cells, and a second pair of opposed surfaces between the edges of the first mentioned pair of surfaces, with the distance between said second mentioned surfaces being less than the width of each of the cells, said connector means and said cells being held together by adhesive means.

2. The battery as defined in claim 1, in which each cell has insulation means surrounding the cell and the connector means is connected to the insulation.

3. The battery as defined in claim 1, in which the connector means is made of an insulating material.

4. The battery as defined in claim 1, in which the connector means is an adhesive material.

5. The battery as defined in claim 1, in which guide means are provided to guide the insertion of the battery set into a battery compartment adapted to receive said battery set, said guide means comprising a second mentioned surface of the connector means and portions of a pair of cell walls adjacent the connector means.

6. The battery set as defined in claim 1 in combination with a camera having a camera case and a battery compartment in said camera case, in which said camera has contact points containing the terminals of said battery set, and in which said battery set is positioned as a unit in said battery compartment.

7. The combination as defined in claim 6, in which the camera battery compartment has guide means for the battery set, and the battery set has guide means adapted to cooperate with said battery compartment guide means, said battery set guide means comprising a second mentioned surface of the connector means and a pair of cell walls adjacent said connector means.

References Cited

UNITED STATES PATENTS

| | | | |
|---|---|---|---|
| 2,042,806 | 6/1936 | Schulte | 136—108 |
| 2,209,927 | 7/1940 | Nichols | 136—108 |
| 3,027,682 | 4/1962 | Schlau | 136—173 XR |
| 3,321,332 | 5/1967 | Vignini | 136—108 XR |

FOREIGN PATENTS

| | | |
|---|---|---|
| 419,157 | 9/1925 | Germany. |

WINSTON A. DOUGLAS, Primary Examiner

D. L. WALTON, Assistant Examiner

U.S. Cl. X.R.

95—11; 136—108